(12) United States Patent
Dunbar et al.

(10) Patent No.: US 8,572,817 B2
(45) Date of Patent: Nov. 5, 2013

(54) SUBSEA TRANSFER HOOK ADAPTOR

(75) Inventors: Timothy A. Dunbar, San Diego, CA (US); Carl J. Hebert, Arnaudville, LA (US)

(73) Assignee: J. Ray McDermott, S.A., Houston, TX (US)

( * ) Notice: Subject to any disclaimer, the term of this patent is extended or adjusted under 35 U.S.C. 154(b) by 282 days.

(21) Appl. No.: 12/401,925

(22) Filed: Mar. 11, 2009

(65) Prior Publication Data
US 2010/0229352 A1  Sep. 16, 2010

(51) Int. Cl.
*B66C 1/00* (2006.01)

(52) U.S. Cl.
USPC .............. 24/455; 24/369; 24/373; 24/583.11; 24/598.4; 294/82.1; 294/82.17; 294/82.21; 294/82.22; 294/82.35

(58) Field of Classification Search
USPC .................... 24/369, 373, 455, 583.11, 598.4; 294/82.1, 82.35, 82.17, 82.21, 82.22; 59/23
See application file for complete search history.

(56) References Cited

U.S. PATENT DOCUMENTS

| | | | | |
|---|---|---|---|---|
| 1,194,005 | A * | 8/1916 | From | 294/82.21 |
| 1,222,997 | A * | 4/1917 | Rottmer | 59/86 |
| 1,371,452 | A * | 3/1921 | Tors | 294/82.21 |
| 1,381,405 | A * | 6/1921 | Dunham | 294/82.21 |
| 1,392,138 | A * | 9/1921 | Freeman et al. | 278/96 |
| 1,646,546 | A * | 10/1927 | Larsen | 59/86 |
| 1,719,673 | A * | 7/1929 | Rottmer | 59/86 |
| 1,857,091 | A * | 5/1932 | Von Der Horst | 294/82.1 |
| 3,039,161 | A | 6/1962 | Gagnon | |
| 3,754,733 | A * | 8/1973 | Foster | 24/68 R |
| 3,827,746 | A * | 8/1974 | Byers | 294/82.2 |
| 3,962,810 | A * | 6/1976 | Buschini et al. | 43/8 |
| 4,034,568 | A | 7/1977 | Mason | |
| 4,102,124 | A * | 7/1978 | Swager | 59/86 |
| 4,114,940 | A * | 9/1978 | Brynemo et al. | 294/82.19 |
| 4,126,328 | A * | 11/1978 | Old | 172/248 |
| 4,216,987 | A * | 8/1980 | Ely | 294/82.35 |
| 4,256,336 | A * | 3/1981 | Halvorsen | 294/82.19 |
| 4,541,155 | A | 9/1985 | Gagnon | |
| 4,689,859 | A * | 9/1987 | Hauser | 294/82.21 |
| 5,058,243 | A * | 10/1991 | Rasmussen | 24/68 R |

(Continued)

OTHER PUBLICATIONS

SkyDeck Tension Wire Grid System—http://wvvw.iastage.com/skydeck_tension_wire_grid.

*Primary Examiner* — Robert J Sandy
*Assistant Examiner* — David Upchurch
(74) *Attorney, Agent, or Firm* — D. Neil LaHaye

(57) ABSTRACT

A rigid U-shaped structure sized to be closely received on the tip end of the transfer hook. One side of the U-shape of the structure is closed. A padeye is rigidly attached to the end curved portion of the U-shape of the structure. Means for holding the U-shaped structure in position on the tip end of the hook is provided. The holding means may be threaded bores through one or both sides of the U-shaped structure that allow bolts to be threaded through the holes such that they create sufficient friction against the tip end of the transfer hook to hold the U-shaped structure in position. The holes through the U-shaped structure may be unthreaded with threaded nuts rigidly attached to the U-shaped structure such that the nuts are aligned with the holes to allow bolts to exert pressure against the tip end of the transfer hook in the same manner to hold the U-shaped structure in position on the transfer hook.

6 Claims, 5 Drawing Sheets

(56) References Cited

U.S. PATENT DOCUMENTS

| | | | |
|---|---|---|---|
| 5,108,139 A * | 4/1992 | Leech | 294/82.17 |
| 5,927,780 A * | 7/1999 | Chandler | 294/82.11 |
| 7,393,033 B1 * | 7/2008 | Bisso, IV | 294/82.1 |

* cited by examiner

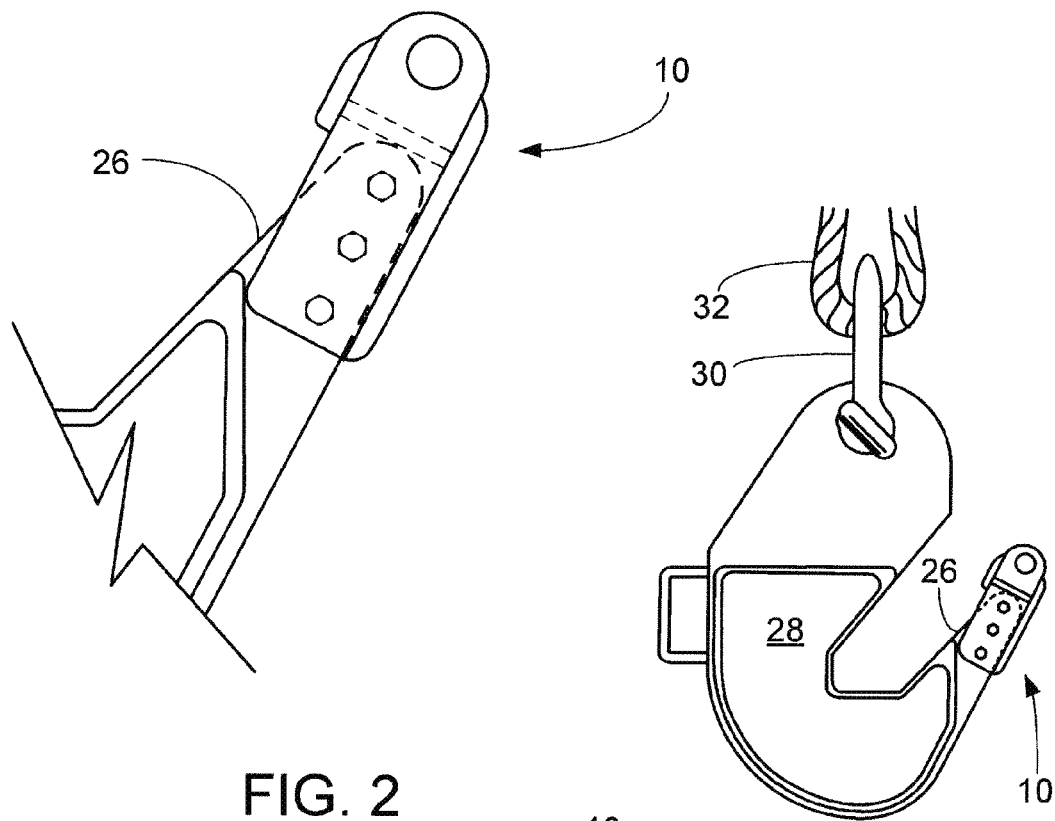
FIG. 2
FIG. 1
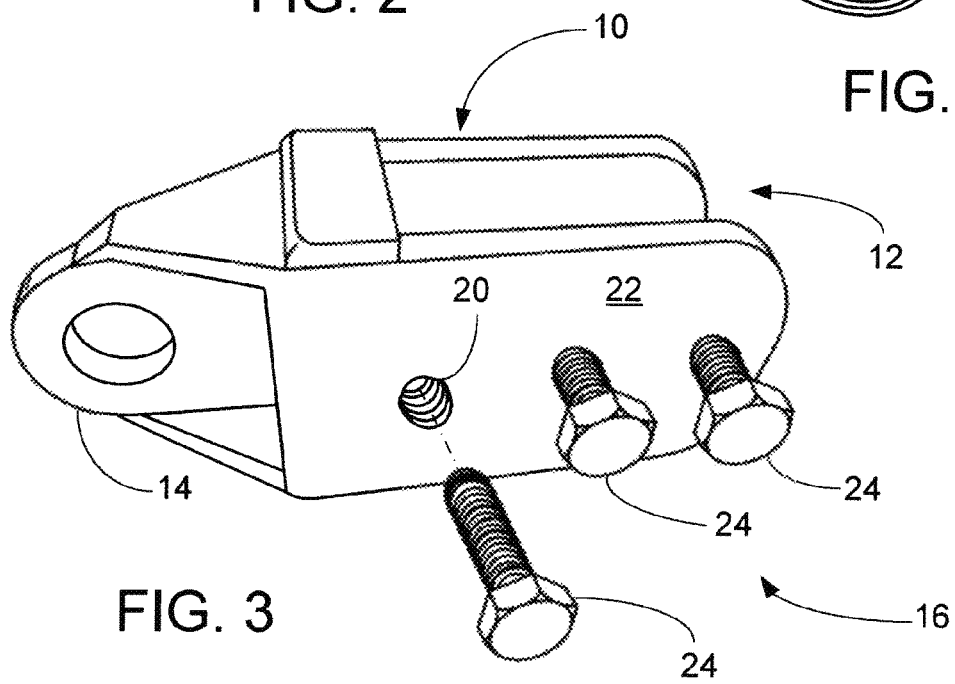
FIG. 3

SUBSEA TRANSFER HOOK ADAPTOR

FIELD AND BACKGROUND OF INVENTION

The invention is generally related to subsea abandonment and recovery operations and more particularly to the hooks used in such operations.

A conventional hook designed for subsea operations usually involves a padeye on the tip end which serves as a rigging aid to offshore personnel during subsea operations. The padeye provides for attachment of a trip line to move the tip end of the hook into a desired orientation and position for releasing or catching an item.

While there are a number of hooks for subsea operations that have been specifically designed and built to have a padeye at the tip end to make them usable in operations that require a specific movement of the tip, there are also many hooks in use in the offshore industry that have not been designed and built with an integral padeye at the tip end. The result is that the use of these hooks can be very limited, especially in recovery operations. Because hooks used in subsea operations must meet specific industry standard requirements regarding lifting capacity, tensile strength, etc., modification of existing hooks by means such as drilling holes therethrough or welding an accessory padeye to the hook will void the certification of the existing hook. The hooks used in subsea operations are used to lower and recover very large diameter wire rope and chains where the chain material may be several inches in diameter and a single chain link may be a few feet long. Thus, the hooks are large, heavy, and expensive pieces of equipment that must have a large lifting capacity.

SUMMARY OF INVENTION

The present invention is drawn to a subsea transfer hook adaptor and method. A rigid U-shaped structure is sized to be closely received on the tip end of the transfer hook. One side of the U-shape of the structure is closed. A padeye is rigidly attached to the end curved portion of the U-shape of the structure. Means for holding the U-shaped structure in position on the tip end of the hook is provided. The holding means may be threaded bores through one or both sides of the U-shaped structure that allow bolts to be threaded through the holes such that they create sufficient friction against the tip end of the transfer hook to hold the U-shaped structure in position. The holes through the U-shaped structure may be unthreaded with threaded nuts rigidly attached to the U-shaped structure such that the nuts are aligned with the holes to allow bolts to exert pressure against the tip end of the transfer hook in the same manner to hold the U-shaped structure in position on the transfer hook.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same:

FIG. 1 is a side view that illustrates the invention attached to a subsea transfer hook.

FIG. 2 is an enlarged view of a portion of FIG. 1 illustrating the invention.

FIG. 3 is a perspective view of the invention.

DESCRIPTION OF THE PREFERRED EMBODIMENTS

Figure 4:
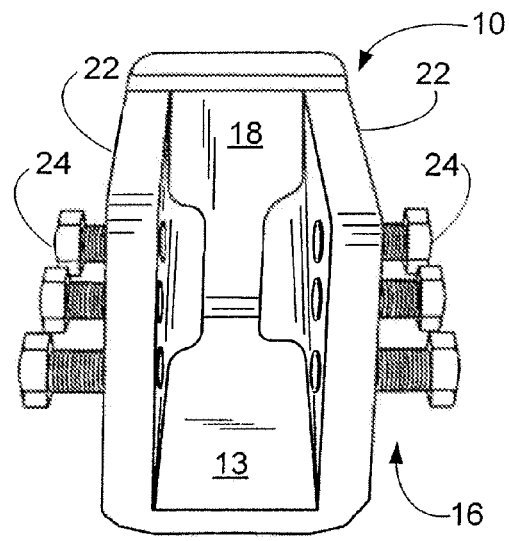
FIG. 4 and 4A are an end views of the invention.
Figure 5:
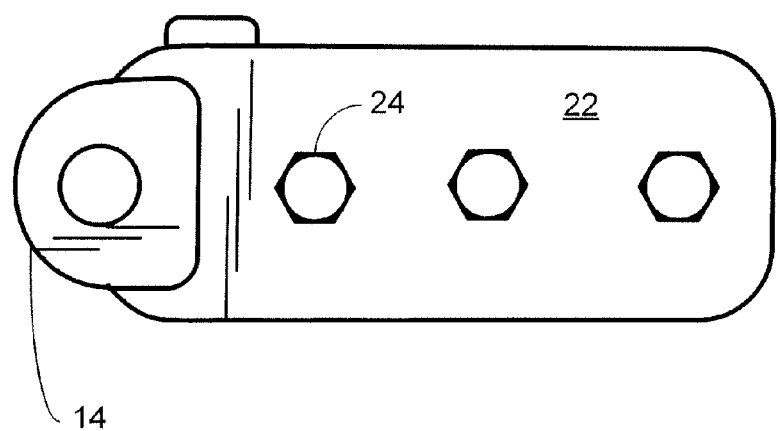
FIG. 5 is a side view of the invention.

As best seen in FIG. 3-5, the subsea transfer hook adaptor is generally indicated by numeral 10 and is generally comprised of a rigid U-shaped structure 12 that is closed on one side of the U-shaped structure 12, with the closed side indicated by numeral 13. A padeye 14 is rigidly attached to the end curved portion of the U-shape of the structure 12. The adaptor 10 is also provided with means 16 for holding the adaptor 10 in position on the tip end of a subsea transfer hook.

As seen in FIG. 4, the inside curved portion 18 of the U-shaped structure 12 is curved to match the contour of the tip end of a subsea transfer hook for a close fit and to preferably encapsulate the tip end of the subsea transfer hook.

Figure 4A:
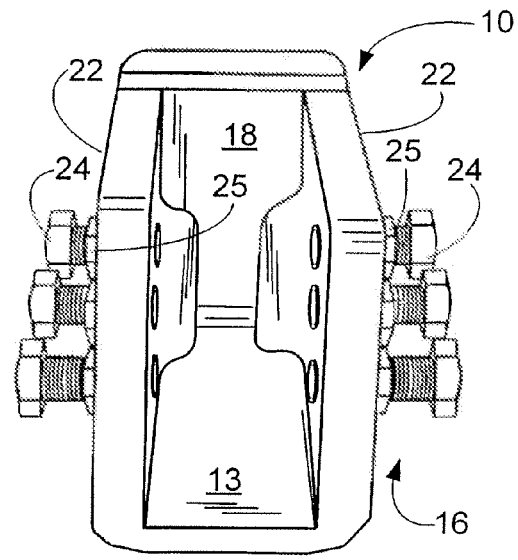

Means 16 to hold the adaptor 10 in position on the tip end of a subsea transfer hook is illustrated as a plurality of threaded bores 20 through the side wall 22 of the U-shaped structure 12 and a bolt 24 received in each bore 20. The bolts 24 are tightened against the tip end of the hook to create sufficient friction to hold the adaptor 10 in position during use. FIG. 4 illustrates the use of threaded bores 20 and bolts 24 on both side walls 22. However, it should be understood that the threaded bores 20 and bolts 24 may be provided on only one side wall 22 when sufficient to provide the required friction. As an alternative to the threaded bores 20, it is also possible to provide smooth bores and then rigidly attach one or more threaded nuts 25 to the side walls 22 in alignment with the bores to accept the bolts 24 as seen in FIG. 4A.

In operation, the subsea transfer hook adaptor is positioned on the tip end 26 of a subsea transfer hook 28 as seen in FIGS. 1 and 2. The bolts 24 are threaded through bores 20 in the side walls 22 and tightened against the tip end 26 of the hook 28, creating sufficient friction to hold the adaptor 10 in position on the hook 28.

Figure 6:
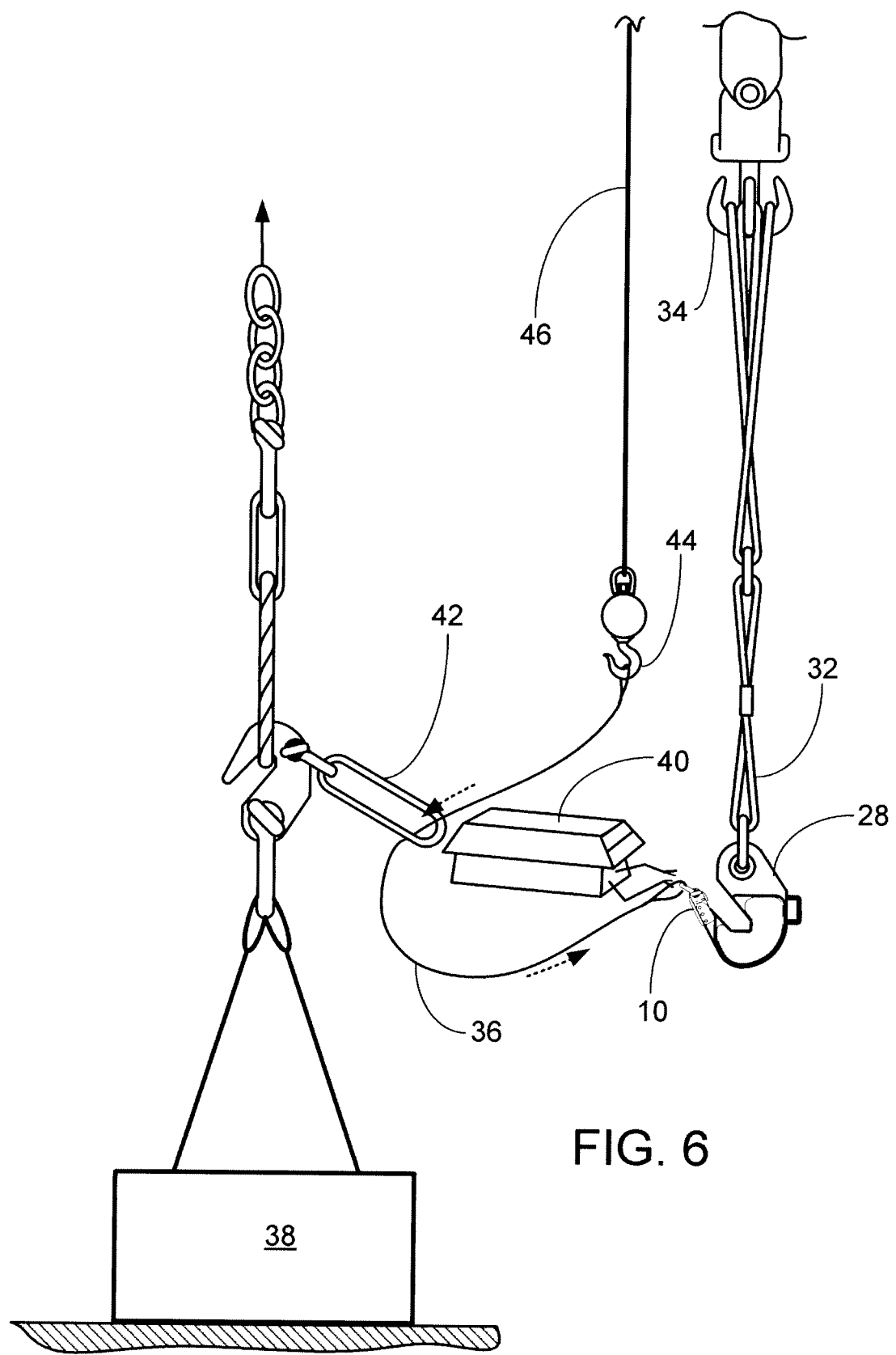
FIG. 6-8 illustrates the invention in use.
Figure 7:
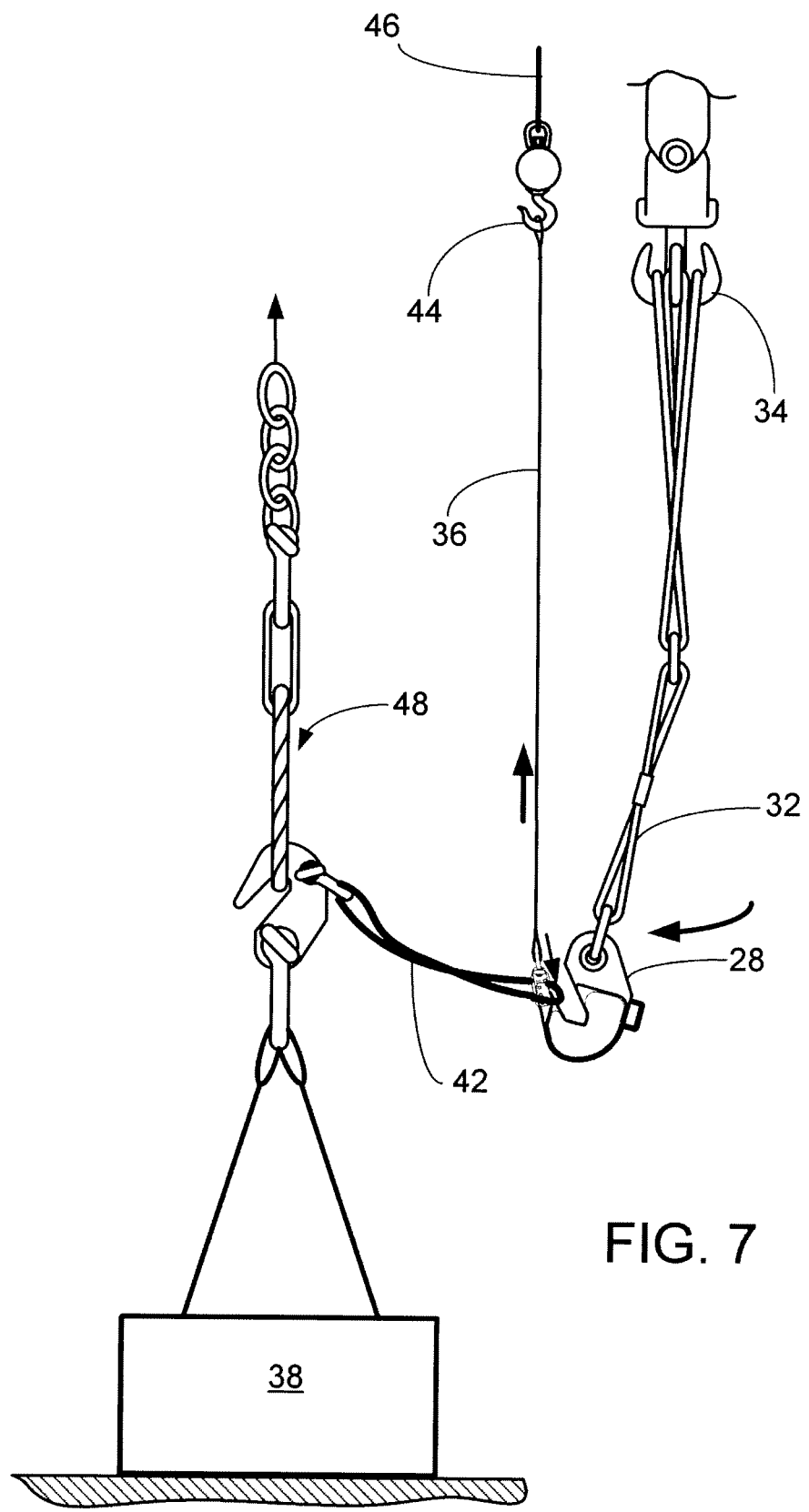

As seen in FIG. 1, a shackle 30 is attached to the eye on the lifting end of the hook 28. The lifting sling 32, seen in FIGS. 1 and 6, is attached to the shackle 30 at one end and to a crane block 34 at the opposite end of the lifting sling 32. A tripping sling 36 is attached to the padeye 14 on adaptor 10. As seen in FIG. 6, the subsea transfer hook 28 with the attached adaptor 10 and tripping sling 36 is lowered into the water near the subsea package 38. An ROV 40 (Remotely Operated Vehicle) is used to thread the tripping sling 36 through the transfer sling 42 and then slip the end of the tripping sling 36 onto the hook 44 of the crane whip line 46. As seen in FIG. 7, the crane whip line 46 is lifted, causing the subsea transfer hook 28 to engage the transfer sling 42. The crane block 34 is then lifted to fully transfer the weight of the subsea package 38 to the crane block 34.

Figure 8:
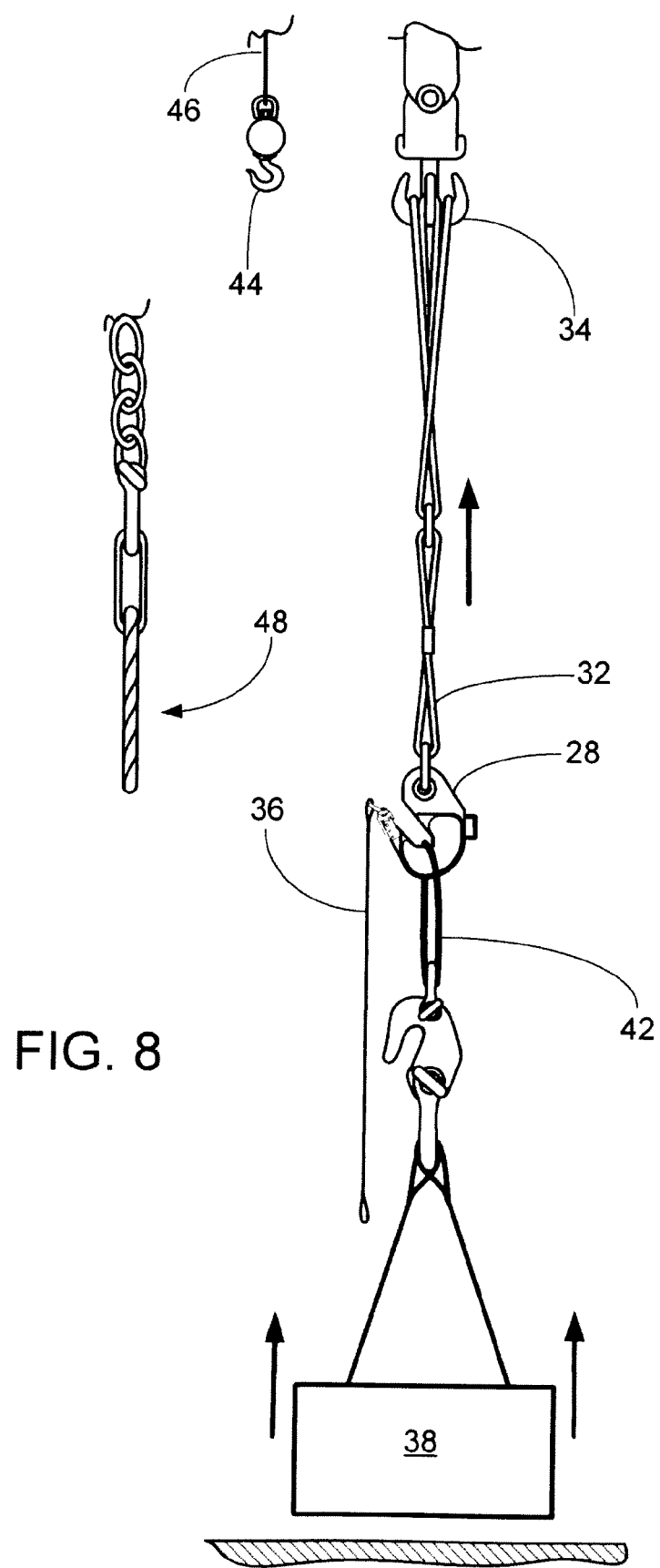

Once the subsea transfer hook 28 has fully engaged the transfer sling 42, the crane whip line 46 is lowered enough to release the tripping line 36 from the hook 44. As seen in FIG. 8, the subsea transfer hook 28, lifting sling 32, and crane block 34 transfer the load of the subsea package 38 off the abandonment and recovery lines 48 for further handling or lifting of the subsea package 38.

The invention provides a number of advantages.

The shape of the adaptor allows it to operate in a manner that does not obstruct the main lifting function of the transfer hook.

Most significantly, some hooks that are in existence, which are used subsea, do not have the capability of being used in certain subsea transfers due to the fact that once the hook is subsea, there is no way of attaching the rigging to the bottom mouth of the hook. In order to attach a tripping sling padeye to the end of the hook, the hook would have to be sent back to land for engineering evaluation, welding certification, and material tempering. Since these hooks often lift hundreds of tons, a person cannot simply weld or tack a padeye onto the hook without violating and negating any material and strength certifications present on the hook.

The invention allows the user to retain material certifications on the hook without going through costly engineering and fabrication rework.

It can be extremely costly (roughly $5,000-$20,000) to fabricate subsea hooks, which is largely due to their material content, specific fabrication, and welding standards. Not only would the design be able to be customized per the individual hook, but the device would be able to be used on a variety of existing hooks that presently do not have subsea transfer capabilities.

Existing hooks that do not contain a padeye on the end for a tripping sling are fine for the one time release of the rigging that normally rests in the mouth of the hook. However, reattaching the rigging once deep below the surface can be very challenging and time consuming. The operation of attaching a piece of rigging to the mouth of a hook without a "tripping sling" padeye can be accomplished, but many attempts would be required and could be very costly to offshore operations. In a situation where the hourly offshore construction rate is more than $20,000 per hour for a vessel, being able to quickly and safely transfer rigging subsea is absolutely crucial. The invention helps to expedite and facilitate the attachment of subsea rigging, thereby saving time and money to offshore operations personnel.

The adaptor provides a means of quickly and easily transferring the load to the subsea transfer hook for the following reasons. The weight of the transfer sling is heavy and cumbersome for the ROV to grasp the transfer sling and lift it onto the subsea transfer hook. Also, it takes too long for the auxiliary crane block to "fish" (make repeated random attempts) for the transfer sling with the subsea transfer hook.

The adaptor simplifies the handling of offshore equipment and materials that are typically very large, very heavy, and generally difficult to manage. Subsea packages can easily weigh 50 tons and more. The size of the chains and lifting slings required to handle such packages are also very large and heavy. As an example, the subsea transfer hook alone is made of steel that is a few inches thick and the hook itself may be 5 to 6 feet tall. A single chain link can be three to four feet long, weigh 300-400 pounds, and the size of the metal forming the link can be three to four inches in diameter.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

What is claimed as invention is:

1. A subsea transfer hook having a lifting end and a tip end and an adaptor on the tip end, the adaptor comprising:
   a rigid U-shaped structure that is sized to be closely received and held in place by friction on and encapsulate the tip end of the subsea transfer hook;
   wherein the rigid U-shaped structure has a closed end and a closed side;
   a padeye rigidly attached to the closed end of the U-shaped structure; and
   means for holding the U-shaped structure in position by friction on the tip end of the subsea transfer hook.

2. The adaptor of claim 1, wherein the closed side of the U-shaped structure has a shape that matches the contour of the tip end of the subsea transfer hook.

3. The adaptor of claim 1, wherein the means for holding the U-shaped structure in position on the tip end of the subsea transfer hook comprises:
   the U-shaped structure having at least one threaded bore through the a side ~ of the U- shaped structure; and
   a bolt received through the at least one threaded bore in friction contact with the tip end of the subsea transfer hook.

4. The adaptor of claim 1, wherein the means for holding the U-shaped structure in position on the tip end of the subsea transfer hook comprises:
   the U-shaped structure having at least one bore through a side of the U-shaped structure;
   a nut rigidly attached to the side of the U-shaped structure in alignment with the at least one bore; and
   a bolt received through the nut and at least one bore in friction contact with the tip end of the subsea transfer hook.

5. A subsea transfer hook having a lifting end and a tip end and an adaptor on the tip end, the adaptor comprising;
   a rigid U-shaped structure that is sized to be closely received and held in place by friction on and encapsulate the tip end of the subsea transfer hook;
   wherein the rigid U-shaped structure has a closed end and a closed side with the closed side of the U-shaped structure having a shape that matches the contour of the tip end of the subsea transfer hook;
   a padeye rigidly attached to the closed end of the U-shaped structure; and
   means for holding the U-shaped structure in position by friction on the tip end of the subsea transfer hook, comprising:
   the U-shaped structure having at least one threaded bore through a side of the U-shaped structure; and
   a bolt received through the at least one threaded bore in friction contact with the subsea transfer hook.

6. A subsea transfer hook having a lifting end and a tip end and an adaptor on the tip end, the adaptor comprising:
   a rigid U-shaped structure that is sized to be closely received and held in place by friction on and encapsulate the tip end of the subsea transfer hook;
   wherein the rigid U-shaped structure has a closed end and a closed side, with the closed side of the U-shaped structure having a shape that matches the contour of the tip end of the subsea transfer hook;
   a padeye rigidly attached to the closed end of the U-shaped structure; and
   means for holding the U-shaped structure in position by friction on the tip end of the subsea transfer hook, comprising:
   the U-shaped structure having at least one bore through a side of the U-shaped structure;
   a nut rigidly attached to the side of the U-shaped structure in alignment with the at least one bore; and
   a bolt received through the nut and at least one bore in friction contact with the tip end of the subsea transfer hook.

* * * * *

UNITED STATES PATENT AND TRADEMARK OFFICE
CERTIFICATE OF CORRECTION

PATENT NO. : 8,572,817 B2  
APPLICATION NO. : 12/401925  
DATED : November 5, 2013  
INVENTOR(S) : Timothy A. Dunbar and Carl J. Hebert Page 1 of 1

It is certified that error appears in the above-identified patent and that said Letters Patent is hereby corrected as shown below:

In the Claims:

Column 4, line 14 (Claim 3, line 5) after "through" delete "the".

Column 4, line 14 (Claim 3, line 5) after "side" delete "~".

Signed and Sealed this  
Thirty-first Day of December, 2013

Margaret A. Focarino  
*Commissioner for Patents of the United States Patent and Trademark Office*